United States Patent

Lundan et al.

Patent Number: 5,487,777
Date of Patent: Jan. 30, 1996

[54] STABLE CMC SLURRY

[75] Inventors: Arvo O. Lundan; Ånääs: Per-Håkan V.; Mikko J. Lähteenmäki, all of Äänekoski, Finland

[73] Assignee: Metsä-Serla Chemicals Oy, Äänekoski, Finland

[21] Appl. No.: 284,628

[22] PCT Filed: Mar. 30, 1993

[86] PCT No.: PCT/FI93/00132

§ 371 Date: Oct. 7, 1994

§ 102(e) Date: Oct. 7, 1994

[87] PCT Pub. No.: WO93/20139

PCT Pub. Date: Oct. 14, 1993

[30] Foreign Application Priority Data

Mar. 31, 1992 [FI] Finland ................................. 921413
Jul. 3, 1992 [FI] Finland ................................. 923097

[51] Int. Cl.$^6$ ............................................. C09D 101/28
[52] U.S. Cl. ............................................. 106/188
[58] Field of Search ................................. 106/188

[56] References Cited

U.S. PATENT DOCUMENTS

| 3,311,577 | 3/1967 | Rankia | 106/188 |
| 4,561,985 | 12/1985 | Glass, Jr. | 252/8.5 A |
| 4,799,962 | 1/1989 | Ahmad | 106/188 |

FOREIGN PATENT DOCUMENTS

| 0039128 | 11/1981 | European Pat. Off. | 106/188 |
| 53-090367 | 8/1978 | Japan | 106/188 |

Primary Examiner—David Brunsman
Attorney, Agent, or Firm—Birch, Stewart, Kolasch & Birch

[57] ABSTRACT

A new carboxymethyl cellulose slurry comprising:

(a) about 10 to 60%, based on the total weight of the slurry, of carboxymethyl cellulose, (b) about 40 to 60%, based on the total weight of the slurry, of water soluble polyethylene glycol, the average molar mass of which is below about 1000 g/l, and (c) about 1 to 50%, calculated as a solid and based on the total weight of the slurry, of an inert powder or dispersion.

25 Claims, No Drawings

STABLE CMC SLURRY

This is a filing under 35 U.S.C. 371 of PCT/FI93/00132 filed Mar. 30, 1993.

BACKGROUND OF THE INVENTION

The present invention relates to a carboxymethyl cellulose slurry and a process for the preparation thereof.

Carboxymethyl cellulose (CMC) is often used in the form of its sodium salt for modifying the rheologic properties of aqueous liquids. The applications to be considered are the clarification of water, the treatment of minerals, the thickening of foodstuffs and medication, the thickening of farm products, the use in oil drilling liquids, the use in building materials, such as concrete, the modification of ceramic materials, the modification of latex colours, the use in paper coating and the use as a protective colloid in emulsion and suspension polymerization.

CMC has conventionally been delivered in a dry, particulate form. The drawbacks thereof are the formation of dust, the poor dispersing in aqueous liquids and the long dissolution times when CMC is dissolved in water.

The same problems are encountered with the treatment of CMC type powders as generally with dry particulate materials. Since CMC type powders are hygroscopic and absorb moisture from the air their particles can therefore become agglomerated. It is very difficult to disperse agglomerated particles in aqueous liquids. The dissolution of CMC powder is difficult in other respects, too, since the powder tends, during dissolution, to form an agglomerate, the gel on the surface of which prevents water from penetrating into the dry powder inside the agglomerate and from dissolving it.

For the above-mentioned reasons, users of CMC products tend to require them in a form in which they can be easily dissolved in the aqueous system of their process.

The FI-application 885969 presents the delivery of CMC products e.g. in the form of such aqueous dispersions that contain particulate CMC product, polyethylene glycol having a low molecular mass (LWPEG), water and polyethylene glycol having a high molecular mass (HWPEG). LWPEG was defined in the publication as a substituted or non-substituted polyethylene glycol being liquid at room temperature and having a molar mass of about 200 to 700 g/mol. HWPEG was defined as a substituted or non-substituted polyethylene glycol being solid at room temperature and having a molar mass of over 3000 g/mol.

According to the examples of the publication the part of the CMC(Na-salt)-product in the whole mixture counts for 20 to 23% by weight. The part of LWPEG counts for 41 to 48% by weight, the part of water counts for 29 to 33% by weight and the part of HWPEG counts for 3 to 4.5% by weight. The molar masses of the LWPEG-samples used were 200, 300, and 400 g/mol. The molar mass of the HWPEG-samples used was 20,000 g/mol.

The drawback of the product presented in the FI-publication mentioned is that its maximum CMC content giving a sufficiently flowing but stable dispersion, is only about 20% by weight. Despite this, the product according to the publication has a very low dispersion stability. Of the CMC dispersions prepared in the examples only two were stable after 24 hours from the time of preparation. It is clear that such a product cannot be used after storage and transport without cumbersome redispersion.

SUMMARY OF THE INVENTION

The aim of the present invention is to remove these drawbacks, i.e. to provide a stable, concentrated, easily pumpable dispersion or slurry which allows the dissolution of the CMC product more quickly into water. Such a product is easily storable, transportable, pumpable and dissolvable in aqueous mixtures without the formation of precipitations or aggolomerates typical of the handling and treatment of dry powders.

The aims of the present invention have now been achieved by a new carboxymethyl cellulose slurry or dispersion, which is mainly characterized by what has been stated in the characterizing clause of claim 1. It thus has been realized that the above-mentioned usability can be achieved by adding to the carboxymethyl cellulose, LW polyethylene glycol having a molar mass of below about 1000 g/mol, and an inert powder or dispersion. With this inert powder or dispersion extremely high carboxylmethyl cellulose concentrations can be achieved, which we characterize as a slurry. Despite the high concentration, the slurry is very stable and simultaneously easily pumpable. When mixing the slurry in water the sodium carboxymethyl cellulose content of the slurry is quickly and evenly dissolved in water without agglomeration or precipitation.

Practically all CMC qualities, derivatives and particle sizes are suitable for the slurry according to the invention. CMC is usually in the form of its sodium salt. The preparation of the slurry can be done with both technical and purified CMC qualities. Other CMC derivatives, such as carboxymethyl hydroxyethyl cellulose (CMHEC) and crosslinked carboxymethyl cellulose (RSCMC) are also suitable for the preparation of the slurry according to the present invention.

According to one embodiment of the present invention the part of the carboxymethyl cellulose accounts for about 10 to 60% and preferably about 25 to 45% of the total weight of the CMC slurry.

In the carboxymethyl cellulose slurry according to the present invention the polyethylene glycol used has an average molar mass, which is below about 1000 g/mol, preferably between about 200 to 700 g/mol, most preferably between 400 to 600 g/mol, where the polyethylene glycol usually is liquid. The polyethylene glycol used is preferably of one kind with respect to its molar mass. The molar mass distribution is preferably monomodal, whereby by monomodal polyethylene glycol is essentially meant a polyethylene glycol, of the macromolecules of which preferably at least 40% by weight is within the molar mass range M±20%, where M is the average molar mass. With this kind of monotype LW polyethylene glycol, a synergistic effect is achieved together with said inert powder or dispersion.

Of polyethylene glycol also the names polyoxyethylene and polyethylene oxide are used and it is known as a polymer having the formula $H(OCH_2CH_2)_nOH$. The abbreviation PEG is usually used for it, after which abbreviation is generally given the molar mass of the product expressed as g/mol. Thus e.g. PEG 300 means polyethylene glycol having the molar mass 300 g/mol.

In the slurry according to the present invention, most preferably a polyethylene glycol having a molar mass of about 400 to 600 g/mol is used. The preferable portion of polyethylene glycol in the slurry is about 40 to 60% and the most preferable about 50 to 60% of the total weight of the slurry.

The inert powder, which is a main characteristic of the carboxymethyl cellulose slurry according to the present invention, can be any pigment, such as a mineral based, finely-powdered pigment, e.g. a calcium carbonate, clay, talc, titanium dioxide or gypsum based pigment. Calcium carbonate based pigments are known, among others, by the trade names Hydrocarb, Setacarb, Faxe Chalk, DX-40, OPACARB. Clay based pigments are known, among others, by the trade names SPS, Alphafine, Amazon, Superclay, Nuclay. Talc based pigments, among others, are known by the trade name Finntalc. Titanium dioxide based pigments are known, among others, by the trade names Finntitan, and Bayertitan. Gypsum based pigments are known, among others, by the trade name Cocoat.

The inert powder can also be a polymer, resin, or wax based pigment, such as those having the registered trade names Ehodopas, Lytron and Pergopak.

The most advantageous pigments are the calcium carbonate-and clay based pigments and their mixtures. The portion of pigments in the slurry according to the invention is usually about 1 to 50%, preferably about 2 to 15% of the total weight of the slurry.

The inert dispersion component of the CMC slurry according to the invention, is preferably a latex emulsion, a paraffin wax dispersion or a calcium stearate dispersion. Typical latex emulsions are Acronal $^R$, Primal$^R$, Raisional$^R$. Typical paraffin wax dispersions are Mobilwax$^R$, Kenosize$^R$ and Aquamol$^R$. Calcium stearate dispersions are Raisacoat$^R$, Nopcote$^R$ and Valke$^R$. Preferable portions of the dispersion is about 1 to about 50%, most preferably about 2 to about 15%, calculated as dry weight, based on the total weight of the slurry.

According to one preferred embodiment of the invention the carboxymethyl cellulose slurry can also contain water. The portion of water usually is about 1 to 40% and preferably about 2 to 10% of the total weight of the slurry. The water can be added to the composition with the carboxymethyl cellulose and/or the stabilizing inert powder and/or dispersion.

According to the most preferred embodiment of the invention the carboxymethyl cellulose slurry comprises (a) about 30 to 40%, based on the total weight of the slurry, of carboxymethyl cellulose, (b) about 40 to 60%, based on the total weight of the slurry, of polyethylene glycol, the molar mass distribution of which is preferably of one type or monomodal, and the average molar mass of which is between about 200 and 600 g/l, and (c) about 10%, based on the total weight of the slurry, of a pigment.

The order of addition has no essential significance on the properties of the slurry. Preferably the pigment is added as an aqueous slurry, the water content of which usually is 20 to 50% and preferably about 30% calculated on the total weight of the aqueous pigment slurry. If the dispersion added is an emulsion, e.g. a latex, the dry content is preferably about 20 to 50%, most preferably about 30%, calculated on the weight of the added dispersion.

As far as the method is concerned it is also advantageous if the CMC slurry of the invention is stabilized by adding water or an aqueous solution of another water-soluble substance to it. The components are thereby the same as the ones presented above in the description of the slurry according to the invention. The viscosity of the slurry can further be lowered by adding still more polyethylene glycol to it.

In the following the invention is illustrated by means of some examples. The meaning of the used trade names are explained after the examples.

EXAMPLE 1

200 g of PEG 400 was weighed to a vessel of 600 ml, after which 200 g of Finnfix 10 was added to it and the mixture was agitated for about 3 minutes. Finally, 100 g of Hydrocarb 90-dispersion was added under constant agitation. The concentration of the slurry with respect to CMC is in this example 36%, the viscosity of the slurry was 3600 mPas and it was stable an room temperature for over 6 months.

EXAMPLE 2

200 g of PEG 400 was weighed to a vessel of 600 ml, after which 200 g of Finnfix 10 was added to it and the mixture was agitated for about 5 minutes. Finally, 60 g of Cocoat gypsum dispersion was added under constant agitation. The viscosity of the slurry was 3700 mPas and it was stable at room temperature for over 8 months. The concentration of the slurry with respect to CMC is in this example 39%.

EXAMPLE 3

200 g of PEG 400 was weighed to a vessel of 600 ml, after which 160 g of Finnfix 10 was added to it and the mixture was agitated for about 3 minutes. Finally, 36 g of SPS pigment dispersion and 3.5 g of titanium dioxide powder were added under constant agitation. The concentration of the slurry with respect to CMC is in this example 38%, the slurry was very fluid and stable at room temperature for over 5 months.

EXAMPLE 4

200 g of PEG 400 was weighed to a vessel of 600 ml, after which 123 g of Finnfix BX was added to it and the mixture was agitated for about 3 minutes. Finally, 90 g of Hydrocarb 90-dispersion was added under constant agitation. The concentration of the slurry with respect to CMC is in this example 28%, the slurry was very fluid and stable at room temperature for over 6 months.

EXAMPLE 5

200 g of PEG 400 was weighed to a vessel of 600 ml, after which 200 g of Finnfix 10 was added to it and the mixture was agitated for about 4 minutes. Finally, 85 g of Zetacarb powder was added under constant agitation. The concentration of the slurry with respect to CMC is in this example 37%, the slurry was very fluid and stable at room temperature for over 8 months.

EXAMPLE 6

200 g of PEG 400 was weighed to a vessel of 600 ml, after which 69 g of Hydrocarb 90 dispersion was added to it and the mixture was agitated for about 2 minutes. Finally, 128 g of Finnfix 3500 was added. The concentration of the slurry with respect to CMC is in this example 29%, the slurry was very fluid and stable at room temperature for over 3 months.

EXAMPLE 7

200 g of PEG 400 was weighed to a vessel of 600 ml, after which 200 g of Finnfix 10 was added to it and the mixture was agitated for about 5 minutes. Thereafter 53 g of Hydrocarb 90 was added and, finally, 56 g of Finnfix 10 was added under constant agitation. The concentration of the slurry is in this example 45%. The slurry was very fluid and stable at room temperature for over 5 months.

EXAMPLE 8

200 g of PEG 400 was weighed to a vessel of 600 ml, after which 150 g of Finnfix 10 was added to it and the mixture was agitated for about 3 minutes. Finally, 36 g of Finntalk-pigment dispersion was added under constant agitation. The concentration of the slurry with respect to CMC is in this example 26%, the slurry was very fluid and stable at room temperature for over 3 months.

EXAMPLE 9

200 g of PEG 400 was weighed to a vessel of 600 ml, after which 200 g of Finnfix 10 was added to it and the mixture was agitated for about 4 minutes. Thereafter, 125 g of PCC-powder was added, after which 20 g of water was added under constant agitation. The concentration of the slurry with respect to CMC in this example was 33% by weight, the slurry was very fluid and stable at room temperature for over 3 months.

EXAMPLE 10

200 g of PEG 400 was weighed to a vessel of 600 ml, after which 200 g of Finnfix 10 was added to it and the mixture was agitated for about 4 minutes. Finally 100 g of the plastic pigment dispersion Rhodopas S0501 was added. In this example, the concentration of the slurry with respect to CMC is 36% by weight. The slurry was very fluid and stable at room temperature for over 6 months.

EXAMPLE 11

200 g of PEG 400 was weighed into a vessel of 600 ml, after which 200 g of Finnfix 10 was added thereto and the mixture was agitated for about 4 minutes. Thereafter, 120 g of Raisional 1116 latex dispersion was added under constant agitation. The concentration of the slurry with respect to CMC in this example was 35% by weight, the slurry was very fluid and stable at room temperature for over 3 months.

EXAMPLE 12

200 g of PEG 400 was weighed into a vessel of 600 ml, after which 200 g of Finnfix 10 was added thereto and the mixture was agitated for about 4 minutes. Thereafter, 25% of Nopcote 104 Ca stearate dispersion was added, and finally 30 g of PEG 400 was added under constant agitation. The concentration of the slurry with respect to CMC in this example was 40% by weight, the slurry was very fluid and stable at room temperature for over 5 months.

EXAMPLE 13

200 g of PEG 400 was weighed into a vessel of 600 ml, after which 200 g of Finnfix 10 was added thereto and the mixture was agitated for about 3 minutes. Thereafter, 50 g of Aquamol 1200 paraffin wax dispersion was added under constant agitation. The concentration of the slurry with respect to CMC in this example was 40% by weight, the slurry was very fluid and stable at room temperature for over 6 months.

Finnfix 10=NaCMC powder
Hydrocarb 90=calcium carbonate pigment
Cocoat=gypsum based pigment
SPS=clay based pigment
Finnfix BX=NaCMC powder
Setacarb=calcium carbonate pigment
Finnfix 3500=NaCMC powder
Finntalc=talc pigment
PCC powder=precipitated calcium carbonate
Rhodopas S0501=styrene based polymer pigment
Raisional 1116=polyvinyl acetate based latex
Nopcote 104=calcium stearate water dispersion
Aquamol 1200=paraffin wax water dispersion

We claim:

1. A carboxymethyl cellulose slurry which comprises:
   (a) about 10 to 60%, based on the total weight of the slurry, of carboxymethyl cellulose,
   (b) about 40 to 60%, based on the total weight of the slurry, of water soluble polyethylene glycol, the average molar mass of which is below about 1000 g/mol, and
   (c) about 1 to 50%, calculated as a solid and based on the total weight of the slurry, of an inert powder or dispersion.

2. The slurry according to claim 1, wherein the water soluble polyethylene glycol is of only one kind with respect to its molar mass, and has a molar mass of between about 200 and 700 g/mol.

3. The slurry according to claim 1, wherein the inert powder is a mineral based, finely-divided pigment selected from the group consisting of calcium carbonate, clay, talc, titanium dioxide, a gypsum based pigment and mixtures thereof.

4. The A slurry according to claim 3, wherein the mineral based pigment is calcium carbonate or clay based pigment or a mixture thereof.

5. The A slurry according to claim 3 or 4, wherein the portion of the pigment is about 2 to 15% of the total weight of the slurry.

6. The slurry according to claim 1, wherein the dispersion is a latex or paraffin wax dispersion, or a calcium stearate dispersion.

7. The slurry according to claim 1 further containing
   (d) water.

8. The slurry according to claim 7, wherein the portion of water is about 1 to 40%, based on the total weight of the slurry.

9. The slurry according to claim 7, wherein the portion of water is about 2 to 10% based on the total weight of the slurry.

10. The slurry according to claim 1, wherein the average molar mass of said water-soluble polyethylene glycol is between 400 and 600 g/mol.

11. A slurry according to claim 1, wherein the portion of the carboxymethyl cellulose is about 25 to 45% of the total weight of the slurry.

12. The slurry according to claim 1, wherein, the portion of said water-soluble polyethylene glycol is about 50 to 60% of the total weight of the slurry.

13. A method for the preparation of a carboxymethyl cellulose slurry according to claim 1, which comprises mixing about 20 to 60%, based on the total weight of the final slurry, of carboxymethyl cellulose with about 1 to 50%, based on the total weight of the final slurry, of an inert powder or dispersion and about 40 to 60%, based on the total weight of the slurry, of a polyethylene glycol, the average molar mass of which is below 1000 g/mol.

14. The method according to claim 13, wherein the polyethylene glycol is of only one kind with respect to its molar mass, and has a molar mass between about 200 and about 700 g/mol.

15. The method according to claim 13, wherein the inert powder or dispersion is added in the polyethylene glycol before the carboxymethyl cellulose.

16. The method according to claim 13, wherein the dispersion is added as an aqueous emulsion, the dry content of which is about 20 to 50%, based on the total weight of the added dispersion.

17. The method according to claim 13, wherein the inert powder is added as an aqueous slurry, the water content of which is about 20 to 50%, based on the weight of the slurry.

18. The method according to claim 13, wherein the inert powder is a mineral based finely powdered pigment, selected from the group consisting of calcium carbonate, clay, talc, titanium dioxide, gypsum based pigment and mixtures thereof.

19. The method according to claim 13, wherein the mineral based pigment is a calcium carbonate or clay based pigment and mixtures thereof.

20. The method according to claim 13, wherein the mineral based pigment is about 2 to 15% of the total weight of the slurry.

21. The method according to claim 13, wherein the slurry is stabilized by adding water thereto.

22. The method according to claim 13, wherein additional polyethylene glycol is added to the final slurry to lower its viscosity.

23. The method according to claim 13, wherein the dispersion is added as an aqueous emulsion, the dry content of which is about 30% based on the total weight of the added dispersion.

24. The method according to claim 13, wherein the inert powder is added as an aqueous slurry, the water content of which is about 30%, based on the weight of the slurry.

25. A slurry which comprises:
  (a) about 30 to 40%, based on the total weight of the slurry, of carboxymethyl cellulose,
  (b) about 40 to 60%, based on the total weight of the slurry, of polyethylene glycol, the average molar mass of which is between about 200 and about 600 g/mol, and
  (c) about 10%, based on the total weight of the slurry, of a mineral based pigment.

\* \* \* \* \*